United States Patent Office 3,515,727
Patented June 2, 1970

---

3,515,727
SUBSTITUTED TETRAZOLE
William L. Garbrecht, Indianapolis, Ind., assignor to Eli Lilly and Company, Indianapolis, Ind., a corporation of Indiana
No Drawing. Filed Apr. 14, 1967, Ser. No. 630,832
Int. Cl. C07d 55/56; A61k 27/00
U.S. Cl. 260—308                                          4 Claims

ABSTRACT OF THE DISCLOSURE 5-(3-hydroxyphenoxy)-1H-tetrazole is prepared via reaction of resorcinol monoacetate with cyanogen bromide in the presence of triethylamine and sodium azide, followed by hydrolysis under basic conditions. The product, or a nontoxic, physiologically acceptable salt thereof, is used as a sugar substitute for sweetening caloric or noncaloric materials and for the control of viruses.

BACKGROUND OF THE INVENTION

This invention relates to a novel 5-substituted tetrazole and nontoxic, physiologically-acceptable salts thereof and their use in a method of imparting a sweet taste to materials.

Synthetic sweetening agents have for many years had an important place in the diet of persons who, such as diabetics, must necessarily restrict their intake of sugar. In recent times, a much larger group of people has become conscious of synthetic sweeteners as greater emphasis has been placed on low-calorie diets for the treatment of obesity. However, there are relatively few commercially produced substances which exhibit a sweet taste. Presently marketed compounds of the synthetic sweetener variety include sodium cyclamate, saccharin, and combinations thereof.

Saccharin, probably one of the oldest known sugar substitutes, exhibits an intensely sweet taste when in pure form. However, when used in effective amounts, this compound leaves a very bitter aftertaste. Even though saccharin is acceptable as a commercial product, there has been a continuing search for better sugar substitutes.

As a result of the search for a sugar substitute superior to saccharin, a new compound, sodium cyclamate, was discovered, which has the advantage of leaving less bitter aftertaste in the mouth of the user. However, sodium cyclamate is only about one-tenth as sweet as saccharin on a comparative basis, and is relatively expensive to manufacture. Sodium cyclamate in the pure state cannot therefore be marketed competitively with saccharin.

The attempt to find a new and better sugar substitute which would overcome the disadvantages of previous synthetic sweeteners has climaxed in the present invention.

A compound (5-phenoxy-1H)-tetrazole) closely related to the compound of the instant invention is known to the prior art, and disclosures of methods of preparing it are made in the following references: E. Grigat et al., Chem. Ber., 98, 3777 (1965); Martin et al., Angew. Chem., Internat. Edit., 4, 73 (1965); and Belgian Pat. 665,681 (published Oct. 18, 1965). The use of this compound as an intermediate for preparing pharmacologically active compounds is the sole utility taught for it in the prior art.

SUMMARY

The present invention relates to a novel 5-substituted tetrazole and salts thereof, and to a novel method of sweetening caloric and noncaloric materials which comprises commingling with such materials a compound selected from the group consisting of 5-(3-hydroxyphenoxy)-1H-tetrazole of the following formula and the nontoxic, physiologically-acceptable water-soluble salts thereof:

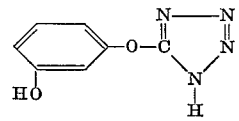

Nontoxic, physiologically-acceptable, water-soluble salts include the sodium, calcium, and ammonium salts and the like.

The novel compound, 5-(3-hydroxyphenoxy)-1H-tetrazole, very surprisingly is about two hundred times as sweet as sucrose. Both it and its nontoxic, physologically-acceptable, water-soluble salts are useful as sugar substitutes or synthetic sweeteners.

The principal object of this invention is to provide a novel 5-substituted tetrazole and nontoxic, physiologically-acceptable salts thereof, and a method of sweetening which will overcome the disadvantages and limitations attendant upon the use of previously developed synthetic sweeteners.

Very surprisingly and unexpectedly it has been found that 5-(3-hydroxyphenoxy)-1H-tetrazole and its nontoxic, water-soluble, physiologically-acceptable salts alone or in combination with caloric materials (such as foodstuffs) or noncaloric materials (such as chemotherapeutic agents) for animal consumption, exhibit a pleasant sweet taste without concomitant bitter aftertaste. Thus, in one of its aspects, the present invention comprises the method of sweetening such materials for animal consumption which comprises the step of adding thereto an effective amount of a compound which exhibits a sweet taste selected from the group of 5-(3-hydroxyphenoxy)-1H-tetrazole and the nontoxic, soluble, physiologically-acceptable salts thereof.

The physiological mechanism whereby the compounds of this invention exhibit a sweet taste is not understood, and there appears to be no logical basis for determining the effect of structural variations among chemical compounds except by preparing the compounds and taste-testing them. In so doing, it has been found that simple structural changes completely destroy the sweet taste. The taste of several 5-aryloxy-1H-tetrazoles bearing different substituents is recorded in the following table:

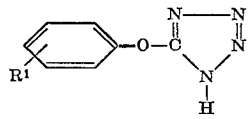

| $R^1$: | Taste |
|---|---|
| 3-COOH | Tasteless. |
| 3-COOCH$_3$ | Do. |
| 3-COOC$_2$H$_5$ | Do. |
| 4-COOCH$_2$H$_5$ | Do. |
| 3-CONH$_2$ | Bitter. |
| 3-CONHCH$_3$ | Do. |
| 3-C$_6$H$_5$CH$_2$O | Tasteless. |
| 4-C$_6$H$_5$CH$_2$O | Do. |
| 2-t-butyl | Do. |
| 4-t-butyl | Do. |
| 3-t-butyl | Bitter. |
| 2-CH$_3$ | Tasteless. |
| 3-CH$_3$ | Do. |
| 4-CH$_3$ | Do. |
| 3-C$_2$H$_5$ | Do. |
| 4-C$_2$H$_5$ | Do. |
| 3-CH$_3$O | Do. |
| 4-CH$_3$O | Do. |
| 2-Cl | Do. |

| $R^1$: | Taste |
|---|---|
| 3-Cl | Do. |
| 4-Cl | Do. |
| 4-Br | Bitter. |
| 3-CH$_3$CONH | Do. |
| 4-CH$_3$CONH | Do. |
| 3,5-diCH$_3$ | Tasteless. |
| 3,4-diCH$_3$ | Bitter. |
| H | Very weakly sweet. |
| 3-OH | Very sweet. |
| 3-OH, Na salt | Do. |
| 3-OH, Ca salt | Do. |
| 3-OH, NH$_4$ salt | Do. |

A number of compositions of matter were prepared and tested in order to determine the most acceptable usage level for 5-(3-hydroxyphenoxy)-1H-tetrazole and its non-toxic salts in combination with various materials for animal (e.g. human) consumption. The following preparations are illustrative:

Example 1

One teaspoonful of a 0.015 percent aqueous solution of 5-(3-hydroxyphenoxy)-1H-tetrazole was added to a cup of coffee (180 ml.). It was found that the aqueous solution mixed well with the coffee; and upon taste-testing, it was determined that the sweetness was about equivalent to that of coffee sweetened with 1 teaspoonful of sugar.

Example 2

One teaspoonful of a 0.015 percent aqueous solution of 5-(3-hydroxyphenoxy)-1H-tetrazole was added to a glass of cold tea. Again it was found as in Example 1 that the resulting product exhibited a sweet taste which was equivalent to that obtained with 1 teaspoonful of sugar (sucrose).

Example 3

Fresh sectioned grapefruit was sweetened to taste with a 0.588 percent aqueous solution of 5-(3-hydroxyphenoxy)-1H-tetrazole, and the resulting product exhibited a sweet taste which closely resembled in taste that obtained with one teaspoonful of sugar.

Example 4

A bowl of a commercial dry breakfast food and milk was sweetened to taste with a 0.588 percent aqueous solution of 5-(3-hydroxyphenoxy)-1H-tetrazole. The resulting product had a sweetness closely resembling in taste that obtained using sugar, and there was no associated aftertaste.

Example 5

Chocolate brownie cookies were prepared using in the recipe 1 tablespoonful of a 5-percent aqueous solution of 5-(3-hydroxyphenoxy)-1H-tetrazole, sodium salt, in place of one-half cup of sugar. The resulting baked product exhibited a pleasant sweet taste on the order of magnitude of that produced by sugar.

Example 6

A lemon-lime flavored carbonated drink was prepared containing 0.045 percent of 5-(3-hydroxyphenoxy)-1H-tetrazole as a sweetening agent. The resulting soft drink exhibited a pleasant, acceptable taste comparable to that produced through the use of a 0.215 percent calcium cyclamate as the sweetening agent.

The above illustrative examples were repeated using a number of products which are normally sweetened. In each case, it was found that the resulting product exhibited a sweet taste which was characteristic of that of sucrose. It was found that, depending upon the application, the acceptable dosage rate was between 10 mg. and 100 mg. per 100 g. for properly sweetened materials. The upper dosage rate was used in pharmaceutical products to make them more palatable.

The phrase "materials for animal consumption" as used in this disclosure includes dry materials as well as aqueous solutions. The phrase also includes water per se. In normal practice the compositions of this invention would be used for human consumption. However, in certain instances such compositions may be prepared for animals other than humans for various reasons.

It is further contemplated that the compounds of this invention may be combined with other sugar substitutes for various reasons. Thus, combinations of 5-(3-hydroxyphenoxy)-1H-tetrazole and salts thereof may suitably be made with saccharin and/or sodium cyclamate, or with maltol.

The tetrazole compounds of the present invention are useful in both caloric materials and noncaloric materials. Caloric materials include food materials for animal consumption which have some food or caloric value. Noncaloric materials include medicines of all kinds, food supplements such as vitamins, and the like. The present invention is useful in conjunction with all such materials.

The preparation of 5-(3-hydroxyphenoxy)-1H-tetrazole is carried out in a manner similar to that described by E. Grigat et al., Chem. Ber., 98, 3777 (1965). A mixture in water of a cyanogen halide (for example, cyanogen bromide), sodium azide, and a resorcinol monoester in which one of the hydroxyl groups of resorcinol is protected by an acyl group is allowed to react. Suitable protective acyl groups include acetyl, benzoyl, 2,4-dinitrobenzoyl, 3,4-dichlorobenzoyl, and the like.

The resulting reaction product mixture is subjected to hydrolysis to remove the acyl group, conveniently by adjusting the pH to strongly basic and refluxing for about one to three hours. The hydrolysis mixture is acidified, the mixture exhaustively extracted with ether, and the combined ether extracts concentrated in vacuo to dryness. The residue is recrystallized from boiling water to yield 5-(3-hydroxyphenoxy)-1H-tetrazole.

Alternatively, the intermediate 5-(3-acyloxyphenoxy)-1H-tetrazole can be isolated by acidifying the reaction product mixture with an aqueous acid, for example, 6 N aqueous hydrochloric acid, refrigerated overnight, and the crystalline product, 5-(3-acyloxyphenoxy)-1H-tetrazole recovered by filtration. The acyloxy compound is hydrolyzed under basic conditions to remove the acyl group. Acidification and separation of the hydroxyphenoxytetrazole is done as before.

The term "water-soluble salts" as used with reference to this invention includes those salts prepared from cationic materials sufficiently basic to react with 5-(3-hydroxyphenoxy)-1H-tetrazole to form salts thereof. With respect to inorganic materials it has been found that the sodium, calcium, and ammonium cations are best suited for the formation of a salt. This is particularly true from the viewpoint of the toxic effect of the compounds as well as considerations of economy. That the salts of 5-(3-hydroxyphenoxy)-1H-tetrazole formed with the above-mentioned inorganic cations are suitably water-soluble is indicated by their ability to form at room temperature, aqueous solutions containing concentrations of, respectively, up to about 25 percent of the sodium or ammonium salt, and up to about 50 percent of the calcium salt. In addition, it must be appreciated that since the compounds of this invention are acidic in character, they will react with those organic bases of sufficient basicity to form salts. Thus, for example, the compounds of this invention will also react with amines or alkaloids. As an example, consider the d-3-methyl-4-dimethylamino-1,2-diphenyl-2-propionoxybutane salt of 5-(3-hydroxyphenoxy)-1H-tetrazole (M.P. 167–168° C.). This salt, unlike the propionoxybutane free base, is not bitter. The term "salts" as used with reference to this invention thus is to be taken to include inorganic as well as organic cations in combination with the defined class of tetrazoles.

That the syntheses of the compounds useful in this invention may be more easily understood, the following preparative examples are included.

Example 7

5-(3-hydroxyphenoxy)-1H-tetrazole.—To a mixture of 75 ml. of chloroform, 9 g. of resorcinol monoacetate, and 6.15 g. of cyanogen bromide, maintained at a temperature of about 0–5° C., were added 5.9 g. of triethylamine over a period of about 15 minutes. To the mixture thus obtained was added rapidly a solution of 3.8 g. of sodium azide in 50 ml. of water without further cooling. The reaction mixture was then stirred for about two hours. The reaction product mixture was acidified with excess 6 N aqueous hydrochloric acid, the chloroform layer separated, and the aqueous layer extracted twice with 50-ml. portions of ether. The chloroform layer and ether extracts were combined, dried, and concentrated in vacuo. The solid residue which remained was recrystallized from aqueous ethanol to yield a crystalline product having a melting point of about 100–102° C., which was identified by analysis as 5-(3-acetoxyphenoxy)-1H-tetrazole.

Two grams of 5-(3-acetoxyphenoxy)-1H-tetrazole were warmed with excess aqueous sodium hydroxide for about an hour. The hydrolysis mixture was cooled and acidified with concentrated aqueous hyrochloric acid, and the mixture extracted with several volumes of ether. The combined ether extracts were concentrated to dryness in vacuo. The residue was recrystallized from water to yield a crystalline product, 5-(3-hydroxyphenoxy)-1H-tetrazole, weighing 1.5 g. and having a melting point of about 141–143° C.

Example 8

5-(3-hydroxyphenoxy)-1H-tetrazole.—To a mixture of 32.0 g. of bromine and 15 ml. of water in a round-bottom flask equipped with stirrer, condenser, thermometer, and dropping funnel, was added a solution of 10.4 g. of sodium cyanide in 50 ml. of water, the addition being regulated to keep the temperature of the mixture at about 20–30° C. A solution of 42.8 g. of resorcinol monobenzoate in 100 ml. chloroform was added, the reaction mixture was cooled in an ice bath to 0–5° C., and 20.2 g. of triethylamine were added to the reaction mixture dropwise while maintaining the temperature thereof at 0–5° C. A solution of 13.0 g. of sodium azide in 100 ml. water was then added rapidly dropwise with stirring, allowing the temperature of the reaction mixture to rise to approximately 40° C., and stirring was continued for 30 minutes after the addition was complete. The mixture was made basic by the addition of sodium carbonate. A Dean-Stark collecting trap was attached to the reaction flask, and the reaction product mixture was refluxed and stirred for about 2 to 3 hours to remove chloroform and to hydrolyze the benzoate ester. The mixture was cooled, acidified with cold, concentrated aqueous hydrochloric acid, washed three times with 150 ml. of benzene to remove benzoic acid, and the washings discarded. The aqueous layer was acidified and exhaustively extracted with ethyl ether until the copper acetate test was negative for the presence of tetrazole in the aqueous layer. The ether solution was evaporated and the residue recrystallized from boiling water (3 ml. per gram of residue), being decolorized with charcoal and stirred while the crystallization proceeded. The product, 5-(3-hydroxyphenoxy)-1H-tetrazole, was obtained as a solid weighing 33.7 g. (95 percent yield), and having a melting point of about 141–143° C.

Example 9

5-(3-hydroxyphenoxy) - 1H - tetrazole, sodium salt.—A mixture of 35 g. of 5-(3-hydroxyphenoxy)-1H-tetrazole, 12 g. of sodium carbonate, 3 g. decolorizing carbon Darco G–60, 300 ml. of acetonitrile, and 15 ml. of water was refluxed for about 2½ hours. The reaction product mixture was filtered through a heated funnel and cooled. The nearly colorless precipitate which separated was filtered off, washed with acetonitrile, dried, and identified as 5-(3-hydroxyphenoxy) - 1H - tetrazole, sodium salt, dihydrate, having a melting point of about 130–135° C. Weight, 35 g.

Example 10

5-(3-hydroxyphenoxy)-1H-tetrazole, calcium salt.—A solution of 35 g. of 5-(3-hydroxyphenoxy)-1H-tetrazole in 200 ml. of water was neutralized with calcium carbonate, filtered, and concentrated in vacuo. The sirupy residue was triturated with ethyl ether, whereby the sirup solidified. The colorless solid was filtered off, washed with ethyl ether, and dried. It was identified as 5-(3-hydroxyphenoxy)-1H-tetrazole, calcium salt, monohydrate, having a melting point above 250° C.

Example 11

5-(3-hydroxyphenoxy)-1H-tetrazole, ammonium salt.—To 10 g. of 5-(3-hydroxyphenoxy)-1H-tetrazole dissolved in 100 ml. of acetonitrile were added 4.0 ml. of concentrated ammonium hydroxide and the solution was cooled in an ice bath to complete the crystallization. The crystalline product was filtered off, dried, and identified as 5-(3-hydroxyphenoxy)-1H-tetrazole, ammonium salt, having a melting point of about 145–148° C. Weight, 10.8 g.

I claim:

1. The compound 5-(3-hydroxyphenoxy)-1H-tetrazole of the formula

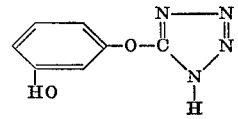

or a nontoxic, physiologically-acceptable, water-soluble salt thereof.

2. A compound as in claim 1, said compound being 5-(3-hydroxyphenoxy)-1H-tetrazole, sodium salt.

3. A compound as in claim 1, said compound being 5-(3-hydroxyphenoxy)-1H-tetrazole, calcium salt.

4. A compound as in claim 1, said compound being 5-(3-hydroxyphenoxy)-1H-tetrazole, ammonium salt.

References Cited

FOREIGN PATENTS 1,216,880  5/1966  Germany.

ALTON D. ROLLINS, Primary Examiner

U.S. Cl. X.R.

99—141; 424—269